(12) United States Patent
Nyffenegger

(10) Patent No.: US 8,118,486 B2
(45) Date of Patent: Feb. 21, 2012

(54) VERY HIGH SPEED TEMPERATURE PROBE

(75) Inventor: Johannes F. Nyffenegger, Laguna Niguel, CA (US)

(73) Assignee: AGlobal Tech, LLC, Las Vegas, NV (US)

( * ) Notice: Subject to any disclaimer, the term of this patent is extended or adjusted under 35 U.S.C. 154(b) by 307 days.

(21) Appl. No.: 12/204,744

(22) Filed: Sep. 4, 2008

(65) Prior Publication Data

US 2010/0074299 A1    Mar. 25, 2010

(51) Int. Cl.
*G01K 7/16* (2006.01)
*H01C 7/04* (2006.01)

(52) U.S. Cl. ........ 374/185; 374/208; 374/163; 374/183; 338/22 R

(58) Field of Classification Search ................. 374/100, 374/163, 185, 183, 208; 73/866.5; 338/22 R, 338/25, 28
See application file for complete search history.

(56) References Cited

U.S. PATENT DOCUMENTS

| | | | |
|---|---|---|---|
| 2,609,470 A * | 9/1952 | Quinn ......................... 338/22 R |
| 3,599,058 A * | 8/1971 | Schillmann et al. ............ 257/42 |
| 3,710,195 A * | 1/1973 | Sada et al. ..................... 361/748 |
| 3,979,229 A * | 9/1976 | Barton et al. .................. 136/232 |
| 4,085,398 A * | 4/1978 | Bertram et al. ................. 338/25 |
| 4,359,372 A * | 11/1982 | Nagai et al. ............... 204/192.21 |
| 4,424,507 A * | 1/1984 | Nagai et al. ................. 338/22 R |
| 5,134,248 A * | 7/1992 | Kiec et al. .................... 174/84 R |
| 5,662,418 A | 9/1997 | Deak et al. |
| 5,726,481 A * | 3/1998 | Moody ......................... 257/467 |
| 5,753,835 A * | 5/1998 | Gustin ......................... 73/866.5 |
| 5,864,282 A * | 1/1999 | Hannigan et al. ............... 338/30 |
| 6,437,681 B1* | 8/2002 | Wang et al. ..................... 338/25 |
| 6,592,253 B2 | 7/2003 | Nyffenegger et al. |
| 7,168,330 B1 | 1/2007 | Nyffenegger |
| 7,188,997 B2* | 3/2007 | Tillman et al. ................. 374/152 |
| 7,855,632 B1* | 12/2010 | Schuh et al. ..................... 338/28 |
| 7,931,401 B2* | 4/2011 | Landis et al. ................. 374/208 |
| 2002/0048314 A1* | 4/2002 | Moore, III ..................... 375/141 |
| 2007/0057759 A1* | 3/2007 | Koyama ..................... 174/84 R |
| 2009/0296781 A1* | 12/2009 | Weber et al. ................... 374/185 |
| 2011/0026562 A1* | 2/2011 | Bernier et al. ................ 374/184 |

FOREIGN PATENT DOCUMENTS

| | | | | |
|---|---|---|---|---|
| JP | 59218928 A | * | 12/1984 |
| JP | 63265401 A | * | 11/1988 |
| JP | 63285906 A | * | 11/1988 |
| JP | 05234714 A | * | 9/1993 |
| JP | 08306508 A | * | 11/1996 |
| JP | 10125508 A | * | 5/1998 |

* cited by examiner

*Primary Examiner* — Gail Verbitsky

(57) ABSTRACT

A very high speed temperature probe is provided that can be used in medical applications and in environments that are corrosive or hostile. The probe has a thin wall housing made of a thermally conductive material, a thin film RTD temperature sensor which is mounted within the interior of the housing and is embedded within a temperature cured composite material. A thermally conductive material is used to fill the interior of the housing. The thin wall housing and absence of entrapped air bubbles or voids in the cured composite and thermally conductive materials cooperate to achieve a low thermal time constant and thus, high temperature measuring speed for the probe.

13 Claims, 2 Drawing Sheets

VERY HIGH SPEED TEMPERATURE PROBE

CROSS REFERENCE TO RELATED CASES

This application incorporates by reference herein, in its entirety, U.S. patent application Ser. No. 12/204,734 filed concurrently herewith in the name of Applicant and entitled "Very High Speed Thin Film RTD Sandwich."

TECHNICAL FIELD

The present invention is generally directed to the field of measuring devices and more particularly, is directed to a very high speed temperature probe. The probe has particular applications in the medical field as well as in environments that are corrosive or hostile.

BACKGROUND OF THE TECHNOLOGY

Temperature probes are used in many applications for measuring the temperature of various objects and environments. U.S. Pat. Nos. 6,592,253 and 7,168,330, in which the Applicant is an inventor, describe prior art embodiments of a temperature probe or combination pressure/temperature transducer, or combination pressure/temperature/flow transducer, respectively.

The fastest temperature probes currently available for critical temperature measurements in extremely corrosive and hostile environments have a thermal time constant of $\geq 350$ ms at best. A temperature probe's thermal time constant determines its response time to temperature measurements and thus, determines its speed.

Speed can be an important consideration when selecting a temperature probe, especially in medical applications where the invasive nature of the measurement, or the particular needs of the patient, may limit the time available to make the measurement. The ability to make high speed temperature measurements also is important in corrosive or hostile environments where prolonged exposure to the media or environment can damage the probe.

The thermal time constant of a temperature probe of any type is the time in seconds, or milliseconds, that it takes the probe to sense and respond to a temperature change of 63.2% of a specific temperature range. Another accepted definition is the length of time that it takes the probe to sense a temperature change from 10% to 90% of a specific temperature range.

A widely accepted temperature range for the measurement and calibration of the time constant of a thin film resistive temperature device (RTD), for example, is the temperature range represented by an agitated ice bath at the lower end and boiling water at the upper end, i.e. 0° C. and 100° C. at sea level, respectively. These two temperatures are often used as a calibration or test temperature range because they are relatively easy to generate and to maintain.

During the manufacture of prior art temperature probes, a production run will occasionally produce a probe with a thermal time constant of $\geq 250$ ms. However, the effective yield in the fabrication of prior art temperature probes is approximately 20%. This means that in a production run of, for example, 10 temperature probes, only 2 probes will perform at a thermal time constant of $\geq 350$ ms.

While the thermal time constants of prior art probes have improved, the improvements have not kept pace with developments in other areas of technology and the associated need to measure temperatures more quickly and in more unstable and hostile environments.

Thus, there is a need in the art for a very high speed temperature probe for making critical temperature measurements, especially in extremely corrosive and hostile environments. Ideally such a high speed temperature probe will have a thermal time constant of at least 200 ms, or better. There also is a need in the art to manufacture such probes with a fabrication yield of 95%, or better, in order to maintain production cost as low as possible.

These and other benefits are realized with the very high speed temperature probe of the present invention.

SUMMARY OF THE INVENTION

The present invention addresses the problems and shortcomings of temperature probes that are known in the prior art by the integration of a novel thin film RTD sandwich design into a novel and unique packaging design. The design of the thin film RTD sandwich is described in Applicant's above referenced concurrently filed patent application entitled "Very High Speed Thin Film RTD Sandwich", which is incorporated in its entirety, herein, by reference.

Use of the novel thin film RTD sandwich in accordance with the present invention results in a temperature probe that has a much lower thermal time constant. Thus, the probe may be used to make temperature measurements at much high speeds. In addition to medical applications, the temperature probe of the present invention can also be used to make temperature measurement in extremely corrosive and hostile environments.

It has been discovered that the temperature probe of the present invention meets or exceeds the following basic specifications.

a) Thermal time constant of $\leq 100$ ms for very high speed medical applications where the diameter of the probe is $\frac{1}{16}$ inch and its length ranges from $\frac{1}{8}$ to $\frac{1}{2}$ inches.

b) Thermal time constant of $\leq 150$ ms for very high speed temperature measurements in extremely corrosive and hostile environments. The diameter of the probe can range from $\frac{1}{8}$ inch to $\frac{1}{2}$ inch, depending on the particular application, i.e. pressure, flow rate of media, for example. The length of the probe can range from $\frac{1}{4}$ to 4 inches.

c) Typical temperature measurements from 30° C. to 45° C., for very high speed medical temperature probe applications.

d) Temperature measurements from −196° C. to 1000° C., divided into sub ranges, for very high speed temperature probes for extremely corrosive and hostile environments.

e) Protective sheath materials include Stainless Steels, variations of Inconel, or Hasteloy, and other materials, for both types of very high speed temperature probes.

f) RTD, Pt, 100Ω, Class A or B, DIN EN 60751, TC 3850 for both types of very high speed temperature probes. Other classifications, such as nickel and copper, may also be used.

g) RTD potted in the tip of the protective sheath using a temperature cured composite consisting of a two component epoxy compound and powdered silver of very high purity for both types of very high speed temperature probes.

h) Flexible enamel insulated signal wires, either in two wire, three wire or four wire configurations, for very high speed medical temperature probes.

i) Flexible enamel insulated signal wires, either in two wire, three wire or four wire configurations, or flexible printed circuit board type signal connection, either in two conductor, three conductor or four conductor configurations, for very high speed temperature probes for extremely corrosive and hostile environments, including vibration and shock.

j) Fully encapsulated signal connections in a foam compound for vibration and shock protection, for the very high speed temperature probe for extremely corrosive and hostile environments.

k) Basic signal interface is by pig tail for both types of very high speed temperature probes.

l) Signal connector compatible with medical signal processing equipment installed on the top end of the protective sheath for very high speed medical temperature probes.

m) Signal connector compatible with industrial or MIL Spec D38999 signal processing equipment installed on the top end of the protective sheath for very high speed temperature probes for extremely corrosive and hostile environments.

n) Compression fittings with heat transfer barrier for very high speed temperature probes for extremely corrosive and hostile environments.

The novel features of the present invention are set out with particularity in the following detailed description of the preferred embodiment. However, the invention will be understood more fully and clearly from the detailed description of the invention as set forth in the accompanying drawings in which:

DETAILED DESCRIPTION OF THE PREFERRED EMBODIMENT

A preferred embodiment of the present invention will now be described with reference to the drawings.

Figure 1:
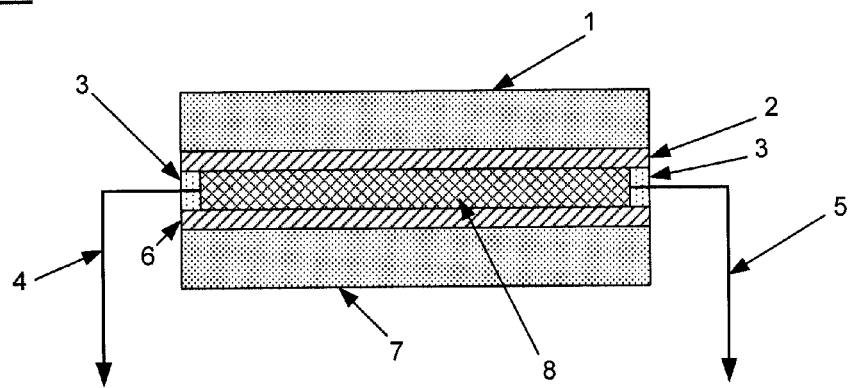
FIG. 1 is a cross-section of a thin film RTD sandwich that is used in the high speed temperature probe of the present invention.

FIG. 1 is a cross-section of the thin film RTD that is incorporated in the very high speed temperature probe of the present invention. As illustrated in FIG. 1, and explained in more detail in Applicant's above referenced concurrently filed patent application, the thin film RTD is of multi-layer construction and includes high purity silver coating layers 1 and 7, phenolic substrate layers 2 and 6, signal conductors 4 and 5 and thin film RTD layer 8. Thin film RTD layer 8 is sealed within the sandwich with a cured epoxy temperature sealant 3.

Figure 2:
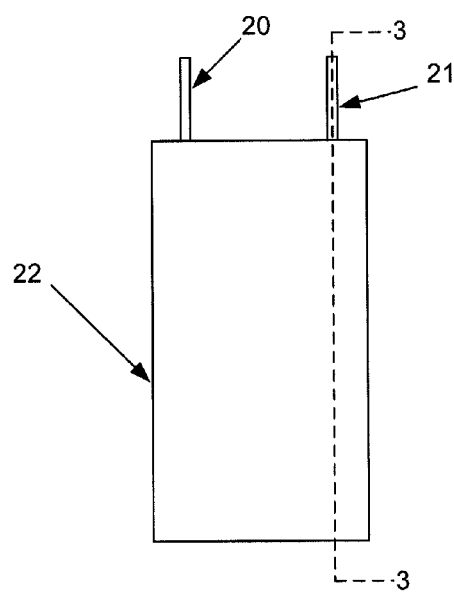
FIG. 2 is a side view of the high speed temperature probe of the present invention.

FIG. 2 illustrates one embodiment of the very high speed temperature probe which incorporates Applicant's novel thin film RTD sandwich. As shown in FIG. 2, the probe includes an outer case or protective sheath 22 made of stainless steel, or other suitable materials, such as Hastelloy, Inconel, or other such materials, and signal conductors 20 and 21 made of flexible enamel insulated conductors.

Figure 3:
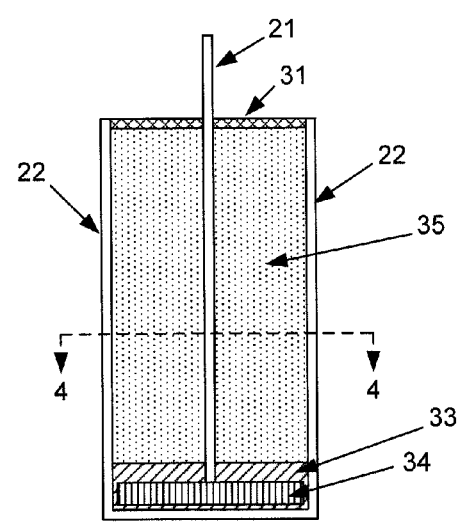
FIG. 3 is a cross-section of the high speed temperature probe illustrated in FIG. 2 taken along lines 3-3 in FIG. 2.

FIG. 3 is a cross-section of the probe of Applicant's invention taken along lines 3-3 of FIG. 2. As shown in FIG. 3, the probe includes protective sheath 22 and signal conductor 21.

In accordance with the present invention, a thin film RTD sandwich 34 is encapsulated at the bottom of protective sheath 22 in a temperature cured composite material 33 formed of an epoxy compound and powdered silver of very high purity. The epoxy compound does not contain any solvents, thus preventing the formation of minute voids or air bubbles when deposited at the bottom of protective sheath 22 and when thin film RTD 34 is pushed into it during the assembly process.

The wall thickness of protective sheath 22 is kept to an absolute minimum in order to prevent the formation of air bubbles or voids during the encapsulation process and to strictly adhere to the curing process of the epoxy/silver composite material 33 to keep the heat transfer time to an absolute minimum. Additionally, the wall thickness is kept absolutely uniform to prevent the formation of minute cracks in the encapsulation due to the formation of hot spots during the temperature curing process. Minute cracks or voids in the epoxy/silver composite material 33 will directly affect the thermal time constant of the temperature probe. It has been found that a wall thickness for the protective sheath 22 of approximately 0.005 inches is ideal.

For a medical application probe, the top of the temperature probe is hermetically sealed with a medically approved cured epoxy sealant 31 as is known in the art. For a probe that is used in corrosive and hostile environments, the top of the probe is sealed with an elastic aerospace type cement as is also known in the art.

The interior of protective sheath 22 is back filled with a temperature cured epoxy thermal conductive material 35.

Figure 4:
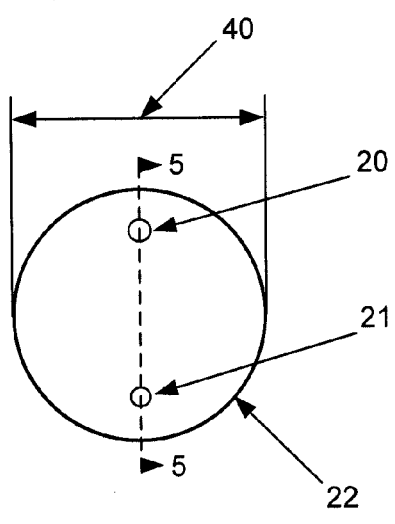
FIG. 4 is a cross-section of the high speed temperature probe illustrated in FIG. 2 taken along lines 4-4 in FIG. 3.

FIG. 4 is a cross-section of the high speed temperature probe illustrated in FIG. 2 taken along lines 4-4 in FIG. 3. The cross-section illustrates protective sheath 22 and signal conductors 20 and 21. In the embodiment of the temperature probe illustrated by the cross-section of FIG. 4, the probe has a diameter 40 of approximately 0.049 inches. This dimensions is for reference purposes only.

Figure 5:
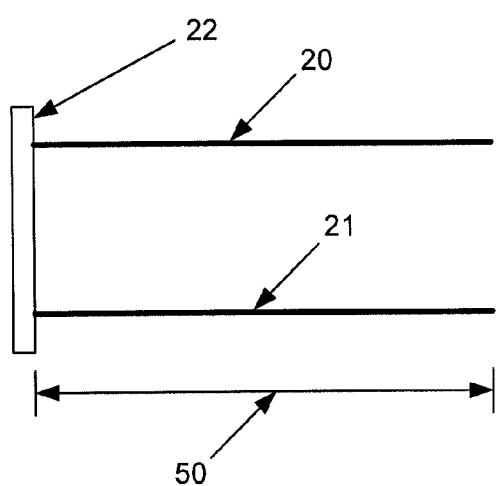
FIG. 5 is a cross section of the high speed temperature probe illustrated in FIG. 4 taken along lines 5-5 in FIG. 4.

FIG. 5 is another cross-section of the high speed temperature probe illustrated in FIG. 2 taken alone lines 5-5 in FIG. 4. In this embodiment, signal conductors 20 and 21 may be a maximum of approximately 4.00 inches long.

It has been found that a temperature probe of the above described construction results in a very low thermal time constant and thus, high measuring speed. Such a probe is particularly useful in medical applications where it often is important to minimize measure time.

In addition to medical applications, the temperature probe of the present invention can also be used in corrosive and hostile environments. In such environments, the construction of the probe is modified in the following manner:

a) The thermal conductive material 35 of the temperature probe is a thermally conductive foam composite that is designed to attenuate the effects of vibration and shock as may be encountered in hostile environments.

b) Depending on the application, the individual wires of the signal conductors 20 and 21 may be replaced by a flexible printed circuit board type signal connection, either in two conductor, three conductor or four conductor configurations.

c) Signal connectors 20 and 21 are compatible with industrial or MIL Spec D38999 signal processing equipment installed on the top end of the protective sheath 22.

d) Compression fitting with heat transfer barrier.

e) The diameter 40 shown in FIG. 4 is ⅛", ¼", ⅜" or ½", depending on the application, i.e. pressure, flow rate of the media.

f) The length of the probe may range from ¼" to 4".

In order to reduce the thermal time constant, it is important to maximize the amount of heat transferred from the outside perimeter of the probe protective sheath 22 to the thin film RTD element 34 encapsulated at the bottom end of the protective sheath 22, to an absolute minimum of time. There are three zones of heat conductive material, at different rates, between the media and the sensing thin film RTD 34. These zones are: (1) protective sheath 22; (2) the cured thermal conductive material 35; and (3) substrate 2-6 of thin film RTD sandwich 34. In accordance with the present invention, ideally there will be no boundary zones between the three zones defined above.

The thickness of the substrate 2-6 in the thin film RTD sandwich 34 is a constant and cannot be changed.

In order to achieve an absolute minimum of propagation time for the transfer of heat, the wall thickness of protective sheath 22 must be configured and maintained at an absolute minimum. Cured thermally conductive material 35 and the encapsulating material 33 used to embed the thin film RTD 34 must be very compact, without any minute entrapped air bubbles or voids.

This will be accomplished by depositing the encapsulating material 33 and the thin film RTD 34 at the bottom of protective sheath 22 in a vacuum environment.

The rate at which heat is conducted and propagates through a medium is defined by the following equation for thermal diffusivity K:

$$K = k/\rho Cp$$

Where:
k=Conduction coefficient of heat transfer
Cp=Specific heat
ρ=Density

This means, that the greater the conduction coefficient of heat transfer k is, the faster heat propagates through a medium.

The conduction coefficient of heat k in Btu·in/hr·ft$^2$·°F is for material that may be used to make protective sheath 2, such as:
Stainless Steel=115
Inconel=104
Hastelloy C2000=63 (RT)
and the Epoxy/Silver Composite≈2000

Thus, the overall time constant of the temperature probe is maximized by (1) keeping the thicknesses of the protective sheath walls at an absolute minimum and maintaining them constant and by (2) the absence of minute air bubbles or voids in the composite of two component epoxy compounds and powdered silver of very high purity used to embed the thin film RTD at the bottom of the protective sheath.

The advantages of the temperature probe of the present invention include the following:

a) At a thermal time constant of ≦100 ms, the fastest and most accurate medical temperature probe in a protective stainless steel sheath can be realized.

b) At a diameter of ¹⁄₁₆", the smallest medical temperatures probe in a protective stainless steel sheath can be realized.

c) At a thermal time constant of ≦150 ms, the fastest temperature probe in a protective sheath of Stainless Steel, Inconel or Hastelloy, for temperature measurements in extreme corrosive and hostile environments available.

d) Manufacturing yield of 95%, or better.

It has been found that the temperature probe of the present invention has a number of practical applications as described below.

High Energy Chemical Lasers, Process Control

The control of a high energy chemical laser requires reliable, repeated, accurate measurements of temperature in mission critical chemical processes at extremely high speeds in highly corrosive and hostile environments. Additionally, the instruments performing these critical measurements are required to directly interface with sophisticated computerized data acquisition systems and are required to pass flight certification requirements. The invention is capable of complying with, or exceeding, all these requirements.

High Energy Chemical Lasers, Optical Mirror Diagnostics

The control of a high energy chemical laser requires reliable, repeated, accurate measurements of mirror surface temperatures for diagnostic purposes at extremely high speeds. Additionally, the instruments performing these critical measurements are required to directly interface with a sophisticated computerized data acquisition system and are required to pass flight certification. The invention is capable of complying with, or exceeding, all these requirements.

High Energy Chemical Lasers, Energy Diagnostics

The control of a high energy chemical laser requires reliable, repeated, accurate measurements of laser power for diagnostic purposes at extremely high speeds. Additionally, the instruments performing these critical measurements are required to directly interface with a sophisticated computerized data acquisition system and are required to pass flight certification. The invention is capable of complying with, or exceeding, these requirements.

Medical—Neurology

Certain surgical procedures in neurology require reliable, repeated and accurate measurements of spinal fluid temperatures at extremely high speeds in a medical environment. Additionally, the instruments performing these critical measurements are required to directly interface with sophisticated computerized medical process control systems used to monitor and control vital patient parameters in closed loop control arrangements. The invention is capable of complying with, or exceeding, all these requirements.

Fishing, Commercial

Certain species of fish follow and feed in specific temperature gradient boundaries occurring in the ocean water surface up to a certain depth. The accurate and extremely fast detection of these minute ocean water surface temperature boundaries can be the determining factor in the success or failure of a commercial fishing enterprise. The instruments used to perform these measurements are required to operate reliably and repeatedly in the corrosive oceanic salt water environment.

The temperature probe of the present invention is capable of complying with, or exceeding, these requirements.

Fishing, Recreational

The temperature probe of the present invention may also be offered in an economical configuration, i.e. a configuration only used for recreational purposes and not in a demanding commercial environment.

Applicant has also discovered that similar beneficial results achieved by the above described high speed temperature probe package design may also be realized by the use of a thermocouple arrangement in lieu of the described thin film RDT sandwich. The principal disadvantage of the thermocouple arrangement is accuracy. However, the accuracy offered by thermocouples may be sufficient for certain applications. Additionally, thermocouples can successfully be used in much higher temperatures than the thin film RTD sandwich.

A thermocouple is an electric temperature measuring device that consists of two wires made of different metals welded together in a bead at their ends, commonly known as junction A and reference junction B. A current flows in the circuit when the two junctions are maintained at different temperatures, i.e., junction A is kept at the temperature to be measured and junction B, the reference, is kept at a known temperature, such as an ice bath. The current is a polynomial function of the temperature difference between junction A and reference junction B.

A number of metals are known in the art that can be used to form a thermocouple for use in the present invention for different temperature ranges and environments, all of which are incorporated, herein, by reference. For example, thermocouples types that are known in the art and are suitable for use with the present invention include, but are not limited to, Type K (Chromel/Alumel), Type E (Chromel/Constantan), Type J (Iron/Constantan), Type N (Nicrosil/Nisil), Types B, R & S (Platinum/Rhodium Alloys), Type T (Copper/Constantan), Type C (Tungsten/Rhenium), Type M (Nickel/Molybdenum/Cobalt) and certain Chromel/Gold/Iron thermocouples. The thermocouple will be embedded in the bottom of the sheath as described above with respect to the thin film RTD element.

As pointed out above, prior art temperature probes suffer from low manufacturing yields. Reason for low yields include, but are not limited to, the following factors.

1) In prior art probes, the thermally conductive bonding agent used to embed the RTD in the protective sheath is a composite comprised of the following three components:
  a) An epoxy compound,
  b) a solvent,
  c) and powdered silver of high purity.

During the curing process at elevated temperatures, most of the solvent escapes as the composite gradually hardens. However, there was no way to know how much of the solvent would actually manage to escape. The solvent escape rate directly affects the time constant of the completed probe, i.e. the time constant is fastest with a prefect solvent escape rate of 100%. If the solvent escape rate is less than 100%, that means that there are minute entrapments and voids in the boundary layer, which directly affects the transfer of heat and thus the time constant. There is no known way or method to effectively control the solvent escape rate, other than to develop an acceptable composite that doesn't use a solvent.

Performing the curing process in a vacuum has helped to improve the manufacturing yield somewhat. The present invention eliminates the low yield problem by replacing the solvent in the conductive bonding agent.

2) If the placement of the thermally conductive bonding agent at the bottom of the sheath is not performed in a very specific way, then minute pockets of air may be entrapped, particularly, if the composite is not fully thawed. Sometimes, these minute bubbles of air do not manage to escape during the thermal curing process and will detrimentally affect the time constant. This is particularly true with longer probes, where it is very difficult to control the process of depositing the composite at the bottom. Again, performing the curing process in a vacuum has helped to improve the manufacturing yield somewhat.

The temperature probe of the present invention uses a thin film RTD sandwich with a pure silver coating. That, and the use of a two component thermally conductive bonding agent, greatly improves the manufacturing yield. In addition, chemically pickling the interior of the sheath at the bottom very slightly will also increase the bonding efficiency.

3) Some prior art thin film RTD elements have manufacturing defects that are very difficult to detect, i.e. the thickness of the protective glass coat on the thin film platinum element may vary considerably, which in turn will detrimentally affect the time constant.

The temperature probe of the present invention uses a thin film RTD sandwich which eliminates this problem.

4) Minute variances in the wall thicknesses of the sheath around the circumference as well as at the bottom may cause minute separations at the boundary layer during the temperature curing process, due to hot spots. These separations are extremely small, but will detrimentally affect the time constant.

It has been discovered that the afore-mentioned problem can be avoided or substantially eliminated by making the sheath of uniform thicknesses by using precision EDM machining processes.

While the foregoing specification teaches the principles of the present invention, with examples provided for the purpose of illustration, it will be appreciated by one skilled in the art from reading this disclosure that various changes in form and detail can be made without departing from the true scope of the invention.

I claim:

1. A temperature probe assembly, said assembly comprising:
  a housing made of a thermally conductive material;
  at least one thin RTD temperature device positioned at the bottom of said housing;
  at least one signal conductor coupled to said temperature sensor and exiting said housing;
  a cured composite material surrounding said temperature sensor within the interior of said housing, wherein said cured composite material includes an epoxy compound and a powdered silver;
  a thermally conductive material filling the interior of said housing around said cured composite material, wherein said thermally conductive material is formed of a cured epoxy material; and
  wherein said cured composite material and said thermally conductive material contains substantially no entrapped air bubbles or voids.

2. The temperature probe assembly of claim 1, wherein said thin film RTD device is of multi-layer construction forming a sandwich.

3. The temperature probe assembly of claim 1, wherein the wall thickness of said housing is less than approximately 0.006 inches.

4. The temperature probe assembly of claim 1, wherein said housing is formed of stainless steel.

5. The temperature probe assembly of claim 1, wherein said housing is formed of Hastelloy.

6. The temperature probe assembly of claim 1, wherein said housing is formed of Inconel.

7. The temperature probe assembly of claim 1, wherein said sealant is formed of an epoxy material.

8. A high speed temperature probe for measuring temperature, said probe comprising:
  a housing made of a thermally conductive material;
  a thin film RTD sandwich temperature sensor positioned at the bottom of said housing;
  at least one signal conductor coupled to said temperature sensor and exiting said housing;
  a cured composite material surrounding said temperature sensor within the interior of said housing, wherein said cured composite material is formed of an epoxy compound and powdered silver;

a thermally conductive material filling the interior of said housing around said cured composite material, wherein said thermally conductive material is formed of a cured epoxy material;

a sealant for sealing the interior of said housing from exposure to the atmosphere, and wherein said composite material and said thermally conductive material contains substantially no entrapped air bubbles or voids.

9. The high speed temperature probe of claim 8, wherein the wall thickness of said housing is less than approximately 0.006 inches.

10. The temperature probe assembly of claim 8, wherein said housing is formed of stainless steel.

11. The temperature probe assembly of claim 8, wherein said housing is formed of Hastelloy.

12. The temperature probe assembly of claim 8, wherein said housing is formed of Inconel.

13. The temperature probe assembly of claim 8, wherein said sealant is formed of an epoxy material.

* * * * *